United States Patent
Sun et al.

(10) Patent No.: US 9,210,488 B2
(45) Date of Patent: Dec. 8, 2015

(54) TIMESTAMP ADJUSTMENT IN MULTI-POINT CONTROL PROTOCOL (MPCP) MESSAGES FOR ETHERNET PASSIVE OPTICAL NETWORK (PON) PROTOCOL OVER COAXIAL NETWORK

(71) Applicant: Futurewei Technologies, Inc., Plano, TX (US)

(72) Inventors: Fanglin Sun, Shenzhen (CN); Quan Bo Zhao, Shenzhen (CN); Li Zhang, Wuhan (CN); Guang Sheng Wu, Shenzhen (CN); Jim Chen, Corona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/051,197

(22) Filed: Oct. 10, 2013

(65) Prior Publication Data

US 2015/0104173 A1    Apr. 16, 2015

(51) Int. Cl.
*H04B 10/00* (2013.01)
*H04J 14/00* (2006.01)
(Continued)

(52) U.S. Cl.
CPC ............ *H04Q 11/0071* (2013.01); *H04L 45/16* (2013.01); *H04L 47/826* (2013.01); *H04Q 11/0067* (2013.01); *H04Q 2011/0064* (2013.01); *H04Q 2011/0079* (2013.01)

(58) Field of Classification Search
CPC ............. H04J 14/0227; H04J 14/0272; H04J 14/0278; H04J 2014/0227; H04J 2203/0057; H04Q 11/0067; H04Q 11/0071; H04Q 2011/0064; H04Q 2011/0079; H04L 45/16; H04L 47/826

USPC .......... 398/58, 67, 74, 75, 154, 155, 158, 161
See application file for complete search history.

(56) References Cited

U.S. PATENT DOCUMENTS 7,733,886 B2 *    6/2010    Choi et al. ................. 370/401
2007/0014575 A1 *  1/2007    Kramer et al. .............. 398/71
(Continued)

OTHER PUBLICATIONS

"IEEE Standard for Informational technology—Telecommunications and information exchange between systems—Local and Metropolitan Networks—Specific requirements, Part 3: Carrier Sense Multiple Access with Collision Detection (CSMA/CD) Access Method and Physical Layer Specifications; Amendment: Media Access Control Parameters, Physical Layers, and Management Parameters for Subscriber Access Networks," IEEE Standards 802.3ah, IEEE Computer Society, LAN/MAN Standards Committee, Sep. 7, 2004, 640 pages.

(Continued)

*Primary Examiner* — Dalzid Singh
(74) *Attorney, Agent, or Firm* — Conley Rose, P.C.; Grant Rodolph; Jonathan K. Polk (57) ABSTRACT

A method performed by a FCU comprising receiving a MPCP request message from a CNU via an electrical network, wherein the MPCP request message comprises a first timestamp, adjusting the first timestamp in the MPCP request message by an electrical network delay, and forwarding the MPCP request message with the adjusted timestamp to an OLT via an optical network. Also disclosed is a method performed by an OLT comprising receiving a MPCP message from a CNU via a FCU and an optical network, obtaining an arrival time of the MPCP message, adjusting a timestamp in the MPCP message by subtracting an electrical network delay from the timestamp, and computing a RTT delay based on the timestamp and the arrival time.

24 Claims, 9 Drawing Sheets

(51) Int. Cl.
*H04J 4/00* (2006.01)
*H04Q 11/00* (2006.01)
*H04L 12/761* (2013.01)
*H04L 12/911* (2013.01)

(56) References Cited

U.S. PATENT DOCUMENTS

2010/0040369 A1* 2/2010 Zhao et al. ............... 398/58
2013/0272708 A1* 10/2013 Mizuguchi et al. ....... 398/71
2013/0315595 A1* 11/2013 Barr ........................ 398/67

OTHER PUBLICATIONS

"Draft Standard for Information technology—Telecommunications and information exchange between systems—Local and metropolitan area networks—Specific Requirements, Part 3: Carrier Sense Multiple Access with Collision Detection (CSMA/CD) Access Method and Physical Layer Specifications, Amendment: Physical Layer Specifications and Management Parameters for 10 Gb/s Passive Optical Networks," IEEE P802.3av D2.2, IEEE Computer Society, LAN/MAN Standards Committee, Dec. 3, 2008, 267 pages.

"Next Generation Ethernet Passive Optical Network (NG-EPON)," Industry Connections Activity Initiation Document (ICAID) Version 1.93, IEEE Standards Association, Sep. 3, 2013, 6 pages.

"Series G: Transmission Systems and Media, Digital Systems and Networks, Digital sections and digital line system—Optical line systems for local and access networks, Broadband optical access systems based on Passive Optical Networks (PON)," ITU-T Recommendation G.983.1, ITU-T Telecommunication Standardization Sector, Jan. 2005, 124 pages.

"Series G: Transmission Systems and Media, Digital Systems and Networks, Digital Sections and digital line systems—Optical line Systems for local and access networks, Gigabit-capable Passive Optical Networks (GPON): Physical Media Dependent (PMD) layer specification," ITU-T Recommendation G.984.2, ITU-T Telecommunication Standardization Sector, Mar. 2003, 38 pages.

"IEEE Standard for a Precision Clock Synchronization Protocol for Networked Measurement and Control Systems," IEEE Instrumentation and Measurement Society, IEEE Standard 1588, Jul. 24, 2008, 289 pages.

"Draft Standard for Ethernet Amendment X: Physical Layer Specifications and Management Parameters for Ethernet Passive Optical Networks Protocol over Coax," IEEE Computer Society—LAN/MAN Standards Committee, IEEE P802.3bn/2, Sep. 17, 2013, 206 pages.

"DOCSIS 3.0 Management Features Differences Technical Report," CableLabs Data-Over-Cable Service Interface Specifications, CM-TR-MGMTv3.0-DIFF-V01-071228, Dec. 28, 2007, 62 pages.

"Cable Modem to Customer Premise Equipment Interface Specification," CableLabs Data-Over-Cable Service Interface Specifications, CM-SP-CMCIv3.0-I01-080320, Mar. 20, 2008, 19 pages.

"DOCSIS 3.0 OSSI Configuration Management Technical Report," CableLabs Data-Over-Cable Service Interface Specifications, CM-TR-OSSIv3.0-CM-V01-080926, Sep. 26, 2008, 84 pages.

"Physical Layer Specification," CableLabs Data-Over-Cable Service Interface Specifications DOCSIS 3.0, CM-SP-PHYv3.0-I08-090121, Jan. 21, 2009, 169 pages.

"MAC and Upper Layer Protocols Interface Specification," CableLabs Data-Over-Cable Service Interface Specifications DOCSIS 3.0, CM-SP-MULPIv3.0-I12-100115, Jan. 15, 2010, 766 pages.

"Operations Support System Interface Specification," CableLabs Data-Over-Cable Service Interface Specifications DOCSIS 3.0, CM-SP-OSSIv3.0-I11-100115, Jan. 15, 2010, 805 pages.

"Security Specification", CableLabs Data-Over-Cable Service Interface Specifications DOCSIS 3.0, CM-SP-SECv3.0-I12-100115, Jan. 15, 2010, 225 pages.

"Downstream RF Interface Specification," CableLabs Data-Over-Cable Service Interface Specifications, CM-SP-DRFI-I11-110210, Feb. 10, 2011, 70 pages.

* cited by examiner

TIMESTAMP ADJUSTMENT IN MULTI-POINT CONTROL PROTOCOL (MPCP) MESSAGES FOR ETHERNET PASSIVE OPTICAL NETWORK (PON) PROTOCOL OVER COAXIAL NETWORK

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile". PON may be a point-to-multipoint (P2MP) network with passive splitters positioned in an optical distribution network (ODN) to enable a single feeding fiber from a central office to serve multiple customer premises. PON may employ different wavelengths for upstream and downstream transmissions. Ethernet passive optical network (EPON) is a PON standard developed by the Institute of Electrical and Electronics Engineers (IEEE) and specified in IEEE documents 802.3ah and 802.3av, both of which are incorporated herein by reference.

There may be a rising demand which supports the use of EPON as an access system to interconnect with multiple coaxial cables to connect Customer Premises Equipment (CPEs) located in the subscribers' homes with an Ethernet PON over Coaxial (EPoC) architecture. In an EPON or an EPoC network, downstream traffic may be broadcast to customer premises, while upstream bandwidths may be shared among multiple customer premises. An upstream scheduler may consider a network round trip time (RTT) delay when assigning upstream transmission times.

SUMMARY

In one embodiment, the disclosure includes a method performed by a fiber coaxial unit (FCU) comprising receiving a Multi-Point Control Protocol (MPCP) request message from a coaxial network unit (CNU) via an electrical network, wherein the MPCP request message comprises a first timestamp, adjusting the first timestamp in the MPCP request message by an electrical network delay, and forwarding the MPCP request message with the adjusted timestamp to an optical line terminal (OLT) via an optical network.

In another embodiment, the disclosure includes a method performed by an OLT comprising receiving a MPCP message from a CNU via a FCU and an optical network, obtaining an arrival time of the MPCP message, adjusting a timestamp in the MPCP message by subtracting an electrical network delay from the timestamp, and computing a RTT delay based on the timestamp and the arrival time.

In yet another embodiment, the disclosure includes a CNU comprising a receiver configured to receive a MPCP message comprising a first timestamp from a FCU via an electrical network, a processor coupled to the receiver configured to set a local time based on the first timestamp, and encode a second timestamp in a MPCP reply message, wherein the second timestamp comprises a local transmission time adjusted for an electrical network delay, and a transmitter coupled to the processor configured to transmit the MPCP reply message to an OLT via the electrical network, the FCU, and an optical network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A PON may be a P2MP network comprising an OLT at a central office, an ODN, and a plurality of optical network units (ONUs) at customer premises. The OLT may implement an EPON Media Access Control (MAC) layer for transmission of Ethernet frames. MPCP may be employed to perform bandwidth assignment, bandwidth polling, auto-discovery, and ranging. Ethernet frames may be broadcast downstream based on a Logical Link Identifier (LLID) embedded in a preamble frame. Upstream bandwidth may be assigned based on an exchange of Gate and Report messages between an OLT and an ONU. A clock synchronization protocol such as IEEE document 1588, which is incorporated by reference, may be used to synchronize clocks throughout a network. Alternatively, MPCP messages may be time stamped and used for clock synchronization between an OLT and ONUs.

Ethernet over Coaxial (EoC) may describe any technology which can be used for transmission of Ethernet frames over a coaxial network. Other than Data Over Cable Service Interface Specification (DOCSIS), all EoC technologies transmit Ethernet Frames in the MAC layer. EoC technologies may include, for example, Multimedia over Coax Alliance (MoCA), Home Grid (G.hn), Home Phoneline Networking Alliance (HPNA), and Home Plug Audio/Visual (A/V). EoC has been adapted to run outdoor coax access from an ONU to an EoC head end connected to CPEs located in subscribers' homes.

An EPoC system may be a hybrid access network employing both optical and coaxial technologies. The EPoC may comprise two segments: an optical segment that may comprise a PON, and a coaxial segment that may comprise a coaxial cable network. In the PON segment, an OLT may be positioned in a local exchange or central office where the OLT may connect the EPoC access network to an Internet Protocol (IP), Synchronous Optical Network (SONET), and/or Asynchronous Transfer Mode (ATM) backbone. In the coaxial segment, CNUs may be positioned at end-user locations, and each CNU may serve a plurality (e.g. three to four) of end users which may be known as subscribers. A FCU may merge the interface between the PON segment and the coaxial segment of the network. The FCU may be a single box unit that may be located where an ONU and a Coaxial Line Terminal (CLT) are fused together, for example, at a curb or at a basement of an apartment building.

In an embodiment of an EPON architecture, the MPCP protocol defined in IEEE 802.3av may provide signaling mechanisms between an OLT and ONUs through a MPCP message exchange. An OLT may assign upstream bandwidths to ONUs by sending MPCP Gate messages. Each MPCP Gate message may comprise a grant start time and a grant length for one or more upstream grants. ONUs may request upstream bandwidths by sending MPCP Report messages. Each MPCP Report message may comprise sizes of one or more queues ready for transmission. ONUs may request to register to an OLT by sending MPCP Registration Request messages comprising the ONUs' capabilities. MPCP Report messages and MPCP Registration Request messages may both be considered MPCP request and/or reply messages.

Each MPCP message may comprise a timestamp that may indicate a message transmission time. A timestamp may be a clock value on a local clock or a local counter at the transmitter when the MPCP message is transmitted. The MPCP protocol may employ a global timing model, where the global reference time may be provided by the OLT clock. All ONUs may be required to adjust their local clocks based on the OLT clock. The MPCP messages timestamps may allow the OLT to estimate a round trip time (e.g upstream and downstream transmission times plus delays) in the network. For example, when an OLT transmits a MPCP Gate message to an ONU, the OLT may time stamp the MPCP Gate message with its current clock time. The ONU may reset its local clock to the OLT clock upon the reception of the MPCP Gate message by setting its local clock to the time value carried in the MPCP Gate message timestamp. The ONU may respond by sending a MPCP Report message and time stamp the MPCP Report message with the ONU's updated clock time at the time of transmission. Upon reception of the MPCP Report message, the OLT may determine the RTT between the OLT and the ONU by computing the difference between the OLT current local clock time and the value in the MPCP Report message timestamp. The OLT may then take the RTT into consideration when assigning upstream grants for the ONU.

The EPON MPCP signaling protocol may be extended to the coaxial segment of the network so that an OLT may allocate upstream bandwidths for CNUs connected on the coaxial network. Applying the same EPON RTT calculation method to the coaxial segment may result in a timing drift since the OLT has no knowledge of the delay inherent in the coaxial network. Thus, a MPCP message transmitted from a CNU may not be received on time at the OLT. Incorporation of the coax delay into the RTT measurement may support EPoC operation.

Disclosed herein are mechanisms to support the unified optical-coaxial network architecture. The disclosed embodiments may support inclusion of the coax delay in a unified optical-coaxial network RTT measurement by adjusting the timestamp in MPCP messages. In one embodiment, the MPCP message timestamp may be adjusted at a FCU. In another embodiment, the MPCP message timestamp may be adjusted at a CNU. In another embodiment, the MPCP message timestamp may be adjusted at an OLT. The disclosed embodiments may determine the coax delay at a FCU and/or a CNU and send the coax delay to the OLT in an Operation, Administration, and Maintenance (OAM) message. In another embodiment, the coax delay may be a constant value, and/or a range of values determined by the OLT based on network deployment configuration. The disclosed embodiments may apply a coax delay value to an individual CNU, a group of CNUs, and/or may apply a different coax delay for a different group of CNUs. In addition, the OLT may incorporate the coax delay into an OLT scheduler to allocate upstream resources and control traffic flow in the network.

EPON MPCP signaling protocol defined in IEEE 802.3.av may be extended to support EPoC network with the added coax delay, which may support direct application of an EPON scheduler to an EPoC network. In addition, the disclosed embodiments may support coexistence of EPON ONUs and EPoC CNUs. It should be noted that in the present disclosure, the terms FCU, Coaxial Media Converter (CMC), Optical Coaxial Converted Unit (OCU) and CLT may be equivalent and may be used interchangeably.

Figure 1:
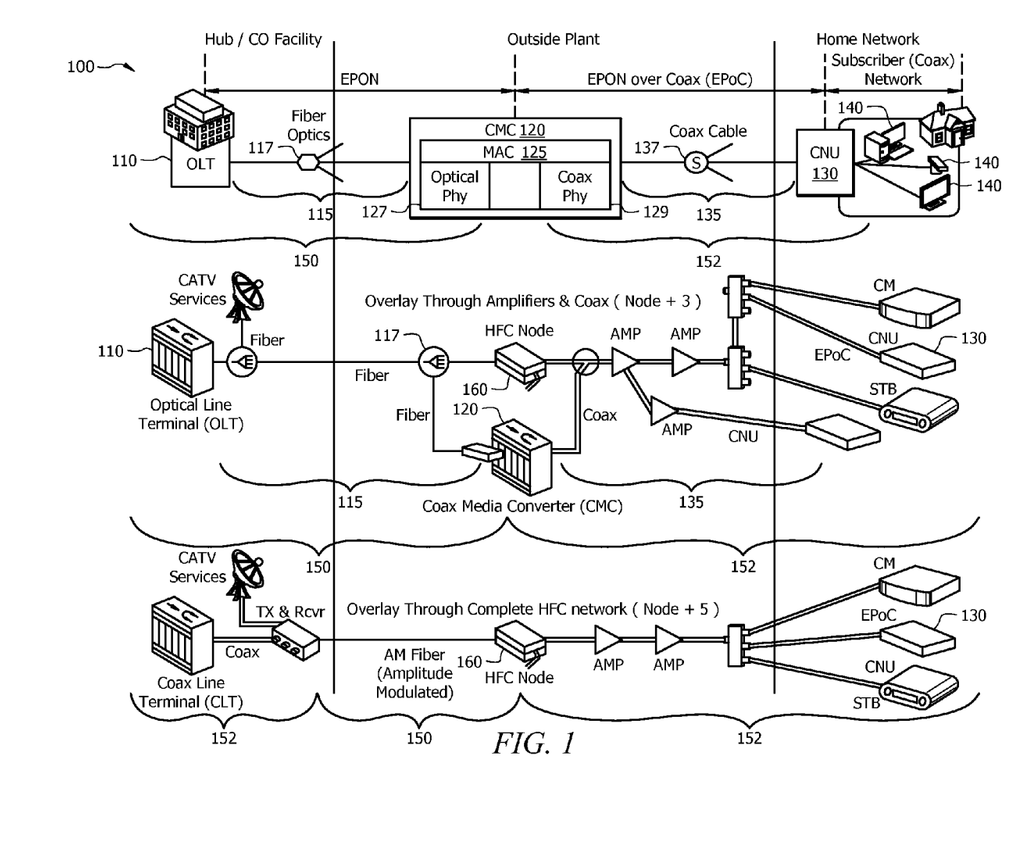
FIG. 1 is a schematic diagram of an embodiment of a unified optical-coaxial network.

FIG. 1 illustrates an embodiment of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140, and a CMC 120 positioned between the OLT 110 and the CNU 130, e.g., between the optical portion 150 and the coaxial portion 152. The OLT 110 may be coupled via an ODN 115 to the CMCs 120, and optionally to one or more ONUs, or one or more Hybrid Fiber Coaxial (HFC) nodes 160 in the optical portion 150. The ODN 115 may comprise fiber optics and an optical splitter 117 and/or a cascade of 1×M passive optical splitters that couple OLT 110 to the CMC 120 and any ONUs. The value of Min EPoC, e.g., the number of CMCs, may for example be 4, 8, 16, or other values and may be selected by the operator depending on factors such as optical power budget. The CMC 120 may be coupled to the CNUs 130 via an electrical distribution network (EDN) 135, which may comprise a cable splitter 137, a cascade of taps/splitters, and/or one or more amplifiers. Each OLT 110 port may serve 32, 64, 128 or 256 CNUs 130. It should be noted that the upstream transmissions from CNUs may only reach the CMC 120 and not the other CNUs 130 due to a directional property of the tap. The distances between the OLT 110 and the ONUs and/or CMCs 120 may range from about 10 to about 20 kilometers, and the distances between the CMC 120 and CNUs 130 may range from about 100 to about 500 meters. The unified optical-coaxial network 100 may comprise any number of HFCs 160, CMCs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that the optical portion 150 may be a communications network that does not require active components to distribute data between the OLT 110 and the CMC 120. Instead, the optical portion 150 may use the passive optical components in the ODN 115 to distribute data between the OLT 110 and the CMC 120. Examples of suitable protocols that may be implemented in the optical portion 150 may include asynchronous transfer mode PON (APON) or broadband PON (BPON) defined by the International Telecommunication Union (ITU) Telecommunication Standardization Sector (ITU-T) document G.983, Gigabit PON (GPON) defined by the ITU-T document G.984, the EPON defined by the IEEE documents 802.3ah and 802.3av, all of which are incorporated by reference as if reproduced in their entirety, the wavelength division multiplexing (WDM) PON (WDM-PON), and the Next Generation EPON (NGE-PON) in development by IEEE.

The OLT 110 may be any device configured to communicate with the CNUs 130 via the CMC 120. The OLT 110 may act as an intermediary between the CMCs 120 and/or CNUs 130 and another backbone network (e.g. the Internet). The OLT 110 may forward data received from a backbone network to the CMCs 120 and/or CNUs 130 and forward data received from the CMCs 120 or CNUs 130 onto the backbone network. Although the specific configuration of the OLT 110 may vary depending on the type of optical protocol implemented in the optical portion 150, in an embodiment, OLT 110 may comprise an optical transmitter and an optical receiver. When the backbone network employs a network protocol that is different from the protocol used in the optical portion 150, OLT 110 may comprise a converter that may convert the backbone network protocol into the protocol of the optical portion 150. The OLT converter may also convert the optical portion 150 protocol into the backbone network protocol.

The ODN 115 may be a data distribution system that may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the CMC 120. It should be noted that the optical fiber cables may be replaced by any optical transmission media in some embodiments. In some embodiments, the ODN 115 may comprise one or more optical amplifiers. The ODN 115 may extend from the OLT 110 to the CMC 120 and any optional ONUs in a branching configuration as shown in FIG. 1, but may be alternatively configured as determined by a person of ordinary skill in the art.

The CMC 120 may be any device or component configured to forward downstream data from the OLT 110 to the corresponding CNUs 130 and forward upstream data from the CNUs 130 to the OLT 110. The CMC 120 may convert the downstream and upstream data appropriately to transfer the data between the optical portion 150 and the coaxial portion 152. The data transferred over the ODN 115 may be transmitted and/or received in the form of optical signals, and the data transferred over the EDN 135 may be transmitted and/or received in the form of electrical signals that may have the same or different logical structure as compared with the optical signals. As such, the CMC 120 may encapsulate or frame the data in the optical portion 150 and the coaxial portion 152 differently. In an embodiment, the CMC 120 may include a MAC layer 125 and physical (PHY) layers, corresponding to the type of signals carried over the respective media. The MAC layer 125 may provide addressing and channel access control services to the PHY layers. As such, the PHY may comprise an optical PHY 127 and a coaxial PHY 129. In many embodiments, the CMC 120 may be transparent to the CNU 130 and OLT 110 in that the frames sent from the OLT 110 to the CNU 130 may be directly addressed to the CNU 130 (e.g. in the destination address), and vice-versa. As such, the CMC 120 may intermediate between network portions, namely an optical portion 150 and a coaxial portion 152 in the example of FIG. 1. As discussed further below, an identifier may be associated with each CMC 120, and the identifier may uniquely identify the each CMC 120.

The electrical portion 152 of the unified electrical and coaxial network 100 may be similar to any known electrical communication system. The electrical portion 152 may not require any active components to distribute data between the CMC 120 and the CNU 130. Instead, the electrical portion 152 may use the passive electrical components in the electrical portion 152 to distribute data between the CMC 120 and the CNUs 130. Alternatively, the electrical portion 152 may use some active components, such as amplifiers. Examples of suitable protocols that may be implemented in the electrical portion 152 include MoCA, G.hn, HPNA, and Home Plug A/V.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the CMC 120 and the CNU 130. It should be noted that the electrical cables may be replaced by any electrical transmission media in some embodiments. In some embodiments, the EDN 135 may comprise one or more electrical amplifiers. The EDN 135 may extend from the CMC 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the CMC 120, and any subscriber devices 140. The CNUs 130 may act as intermediaries between the CMC 120 and the subscriber devices 140. For instance, the CNUs 130 may forward data received from the CMC 120 to the subscriber devices 140, and may forward data received from the subscriber devices 140 toward the OLT 110. Although the specific configuration of the CNUs 130 may vary depending on the type of unified optical-coaxial network 100, in an embodiment, the CNUs 130 may comprise an electrical transmitter configured to send electrical signals to the CMC 120 and an electrical receiver configured to receive electrical signals from the CMC 120. Additionally, the CNUs 130 may comprise a converter that may convert CMC 120 electrical signals into electrical signals for the subscriber devices 140, such as signals in IEEE 802.11 wireless local area network (WiFi) protocol. The CNUs 130 may further comprise a second transmitter and/or receiver that may send and/or receive the converted electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

The OLT 110 may schedule a CNU 130 with an upstream grant by taking the RTT between the OLT 110 and the CNU 130 into consideration. The RTT in a network may vary depend on various factors including system configuration, network deployment, and/or network traffic load. For the example, an embodiment may comprise varying numbers of amplifiers between a CMC 120 and a CNU 130. As another example, the CMC 120 may be located at the head-end in close proximity to the OLT 110. In addition, the RTT in network 100 may include delays over both the optical portion 150 and coaxial (electrical) portion 152 of the network 100.

It should be noted that the present disclosure may describe mechanisms for adjusting the timestamp in a MPCP Report message, which may be sent by a CNU 130 during a bandwidth request. However, it will be understood by those skilled in the art that the MPCP message timestamp adjustment mechanisms set forth herein may also be applied to other MPCP operations, such as a discovery process, where the timestamp adjustment may be applied to a MPCP registration request message sent by a CNU 130.

Figure 2:
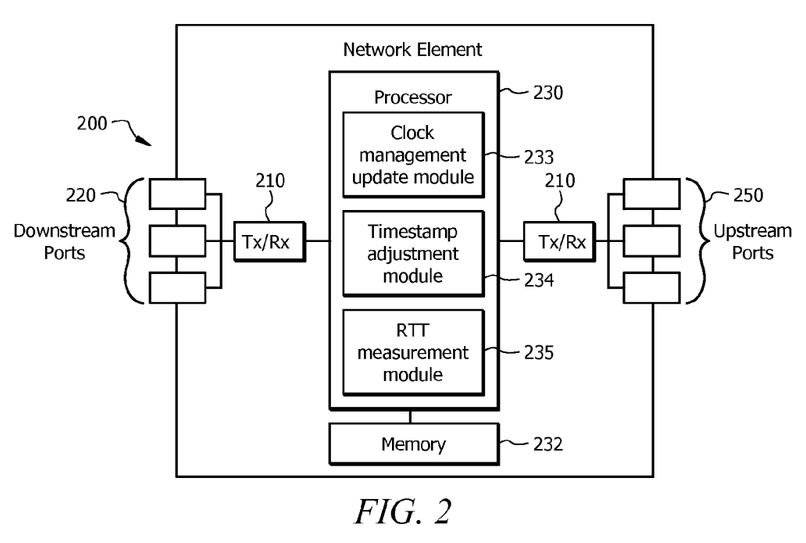
FIG. 2 is a schematic diagram of an embodiment of a network element (NE), which may act as a node in a unified optical-coaxial network.

FIG. 2 is a schematic diagram of an embodiment of a Network Element (NE) 200, which may act as an OLT 110, a FCU 120, or a CNU 130 by implementing any of the schemes described herein. In some embodiments NE 200 may also act as other node(s) in the network. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as a NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a clock management module 233, a timestamp adjustment module 234, and a RTT measurement module 235, which may implement the timestamp adjustment method 500 at a FCU, the timestamp adjustment method 700 at a CNU, and/or the timestamp adjustment method 900 at an OLT, respectively. In an alternative embodiment, the clock management module 234, timestamp adjustment module 235, and/or RTT measurement module 235 may be implemented as instructions stored in the memory devices 232, which may be executed by processor 230. The memory module 232 may comprise a cache for temporarily storing content, e.g., a Random Access Memory (RAM). Additionally, the memory module 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
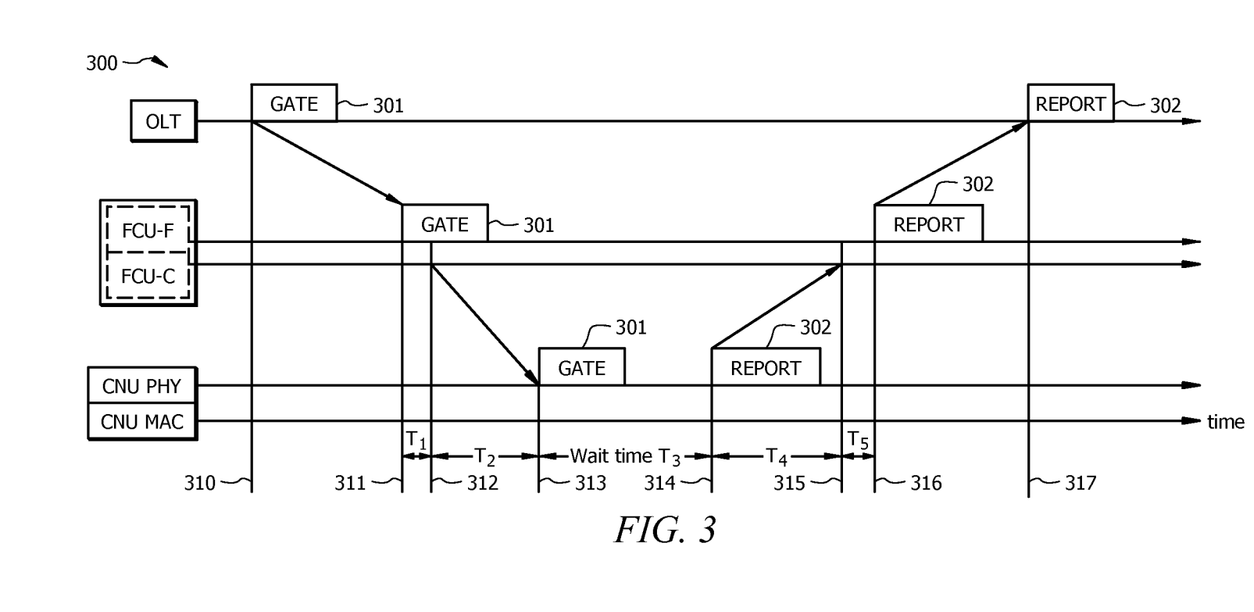
FIG. 3 is a message timing diagram of an embodiment of coaxial (coax) delay factors in a unified optical-coaxial network.

FIG. 3 is a message timing diagram 300 illustrating the transmission delays between a FCU and a CNU in a coaxial portion of a network, such as FCU 120, CNU 130, coaxial portion 152, and network 100, respectively. In the example of FIG. 3, an OLT may transmit a MPCP Gate message 301 to a FCU at time 310. The MPCP Gate message 301 may arrive at the FCU optical PHY at time 311. After a time interval $T_1$ elapses, the FCU coaxial PHY may forward the MPCP Gate message 301 to a CNU at time 312, where the time interval $T_1$ is the FCU downstream residence delay. After a time interval $T_2$ elapses, the MPCP Gate message 301 may arrive at the CNU at time 313, where the time interval $T_2$ is the coaxial downstream propagation delay. After a time interval $T_3$ elapses, the CNU may return a MPCP Report message 302 to the FCU at time 314, where the time interval $T_3$ is the coaxial processing delay. After a time interval $T_4$ elapses, the FCU coax PHY may receive the MPCP Report message 302 at time 315, where the time interval $T_4$ is the coaxial upstream propagation delay. After a time interval $T_5$ elapses, the FCU optical PHY may forward the MPCP Report message 302 to OLT at time 316, where the time interval $T_5$ is the FCU upstream residence delay. The FCU upstream residence delay $T_5$ may include upstream processing delay and packet and/or burst buffering delay, which may be about 1 millisecond (ms). MPCP Report message 302 may arrive at the OLT at time 317. As illustrated in FIG. 3, the coax delay factors may include the FCU downstream residence delay $T_1$, the coaxial downstream propagation delay $T_2$, the CNU processing delay $T_3$, the coaxial upstream propagation delay $T_4$, and the FCU upstream residence delay $T_5$.

In network 100, each device may maintain a local hardware clock and/or counter in the device's operating domain, which may be optical or coaxial domain. The network global reference time may be provided by the OLT 110 clock. Other devices in the network 100, such as FCUs 120 or CNUs 130 may reset their local clock to the OLT clock upon reception of downstream MPCP messages. The disclosed embodiments may preserve the downstream MPCP messages timestamp according to the EPON MPCP protocol, while adjusting the upstream MPCP messages timestamp to include the coax delay at a FCU 120, or a CNU 130, or an OLT 110, which are described in more detail with respect to the figures described below.

Figure 4:
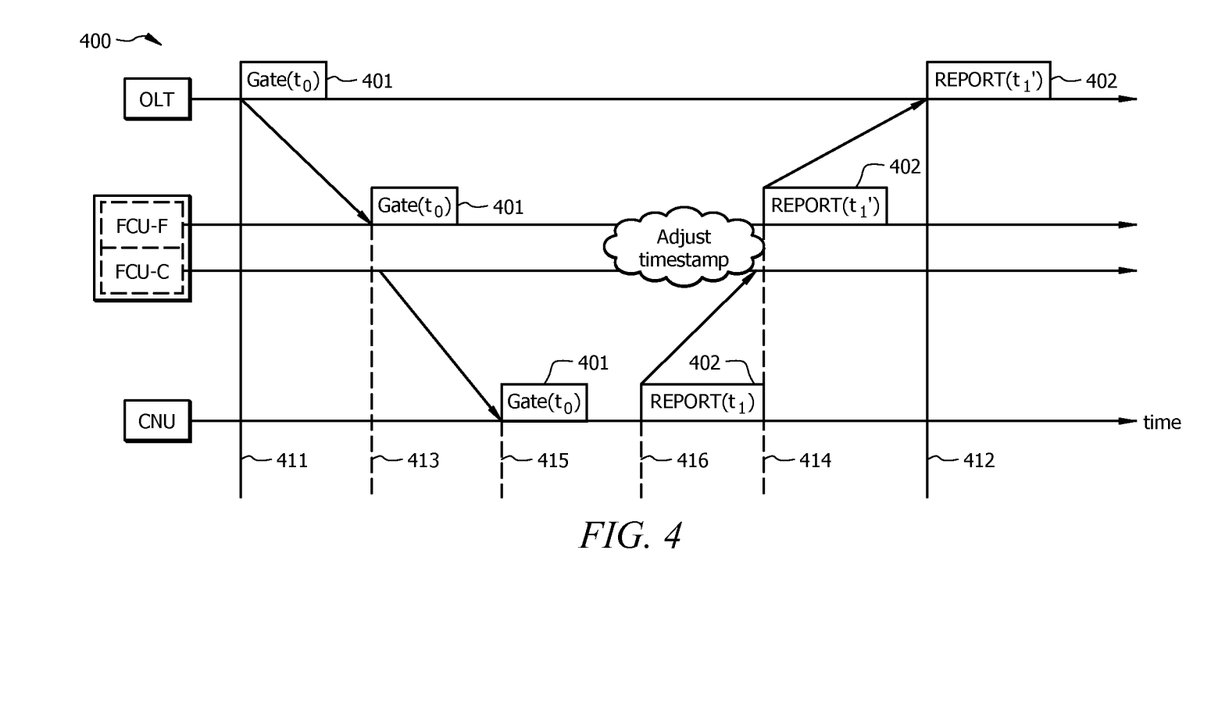
FIG. 4 is a message timing diagram of an embodiment of a method of MPCP message timestamp adjustment at a FCU.

FIG. 4 is a message timing diagram of an embodiment of a method 400 of a MPCP Report message 402 timestamp adjustment at a FCU, such as FCU 120, during bandwidth allocation in a unified optical-coaxial network, such as network 100. According to method 400, an OLT may assign a CNU with an upstream grant by sending a MPCP Gate message 401 to a FCU at OLT local optics time 411. The MPCP Gate message 401 may be time stamped at the OLT MAC layer with the OLT local optics time 411, denoted as $t_0$. When the MPCP Gate message 401 arrives at the FCU optical PHY, the FCU may reset FCU local optics clock time 413 to the received timestamp value $t_0$. Subsequently, the FCU optics clock may continue to run. At the same time, the FCU coax PHY may forward the MPCP Gate message 401 with the timestamp value $t_0$ to the CNU. When the MPCP Gate message 401 arrives at the CNU, the CNU may reset the CNU local coax clock time 415 to the received timestamp value $t_0$. The CNU coax clock may continue to run afterwards.

After the CNU processes the grant, the CNU may send a MPCP Report message 402 to FCU at CNU local coax time 416. The MPCP Report message 402 may be time stamped at the CNU MAC layer with the CNU local coax time 416, denoted as $t_1$. Upon receiving MPCP Report message 402, the FCU may forward the MPCP Report message 402 to the OLT. However, instead of time stamping the MPCP Report message 402 with the local transmission time (e.g. FCU local optics time 414) according to the EPON MPCP protocol, the FCU may load an adjusted value $t_1'$ to the timestamp to incorporate the coax delay as below:

$$t_1' = \text{FCU local optics time 414} - \text{coax delay} \quad (1)$$

Thus, when MPCP Report message 402 arrives at the OLT, the RTT between the OLT and the CNU may be computed according to the EPON MPCP protocol since the FCU has included the coax delay in the timestamp adjustment. The RTT may be the difference between the MPCP Report message 402 arrival time $t_2$ and the timestamp value $t_1'$ carried in the MPCP Report message 402, which may be expressed as:

$$RTT = t_2 - t_1' \quad (2)$$

where $t_2$ is the OLT local optics time 412.

Figure 5:
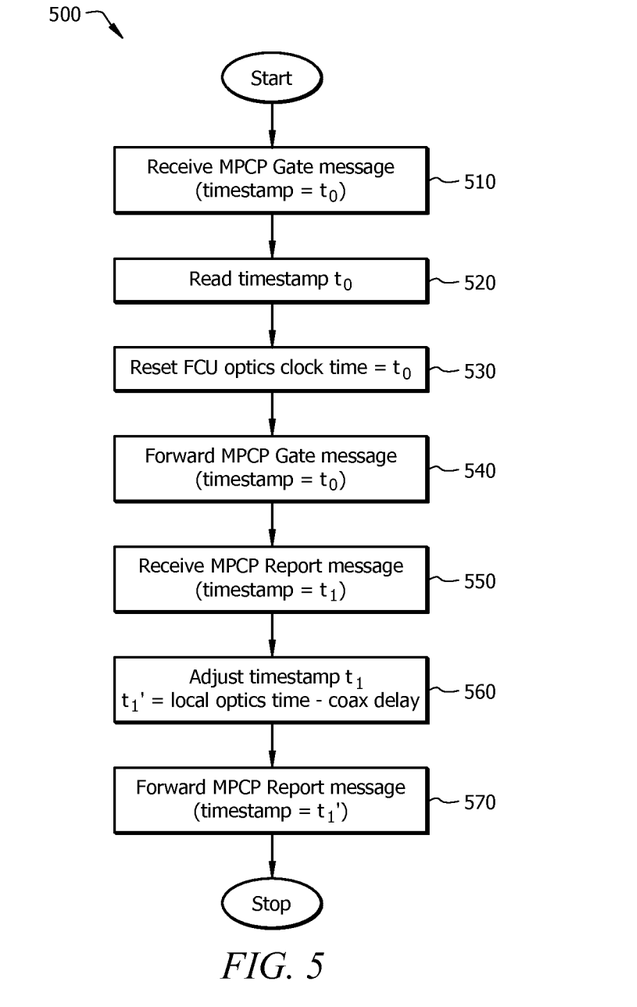
FIG. 5 is a flowchart of another embodiment of a MPCP message timestamp adjustment method at a FCU.

FIG. 5 is a flowchart of a timestamp adjustment method 500, which may be implemented on a FCU, such as FCU 120, during bandwidth allocation to account for the coax delay as described in method 400. The method 500 may receive a MPCP Gate message with a timestamp value $t_0$ from an OLT at step 510. At step 520, the FCU may read the value in the timestamp carried in the MPCP Gate message, which may be the OLT local optics time when the MPCP Gate message is transmitted at the OLT MAC layer. At step 530, the FCU may reset the FCU local optics clock time to the received timestamp value $t_0$. At step 540, the FCU may forward the MPCP Gate message with the same timestamp value $t_0$ to a CNU.

After some time, the FCU may receive a MPCP Report message returned from the CNU with a timestamp value $t_1$ at step 550. At step 560, the FCU may load the MPCP Report message timestamp with an adjusted value $t_1'$, where $t_1'$ is computed by subtracting the coax delay from the FCU local optics time when the MPCP Report message is transmitted at the FCU MAC layer as shown in equation (1) described above in reference to method 400. At step 570, the FCU may forward the MPCP Report message to an OLT.

Figure 6:
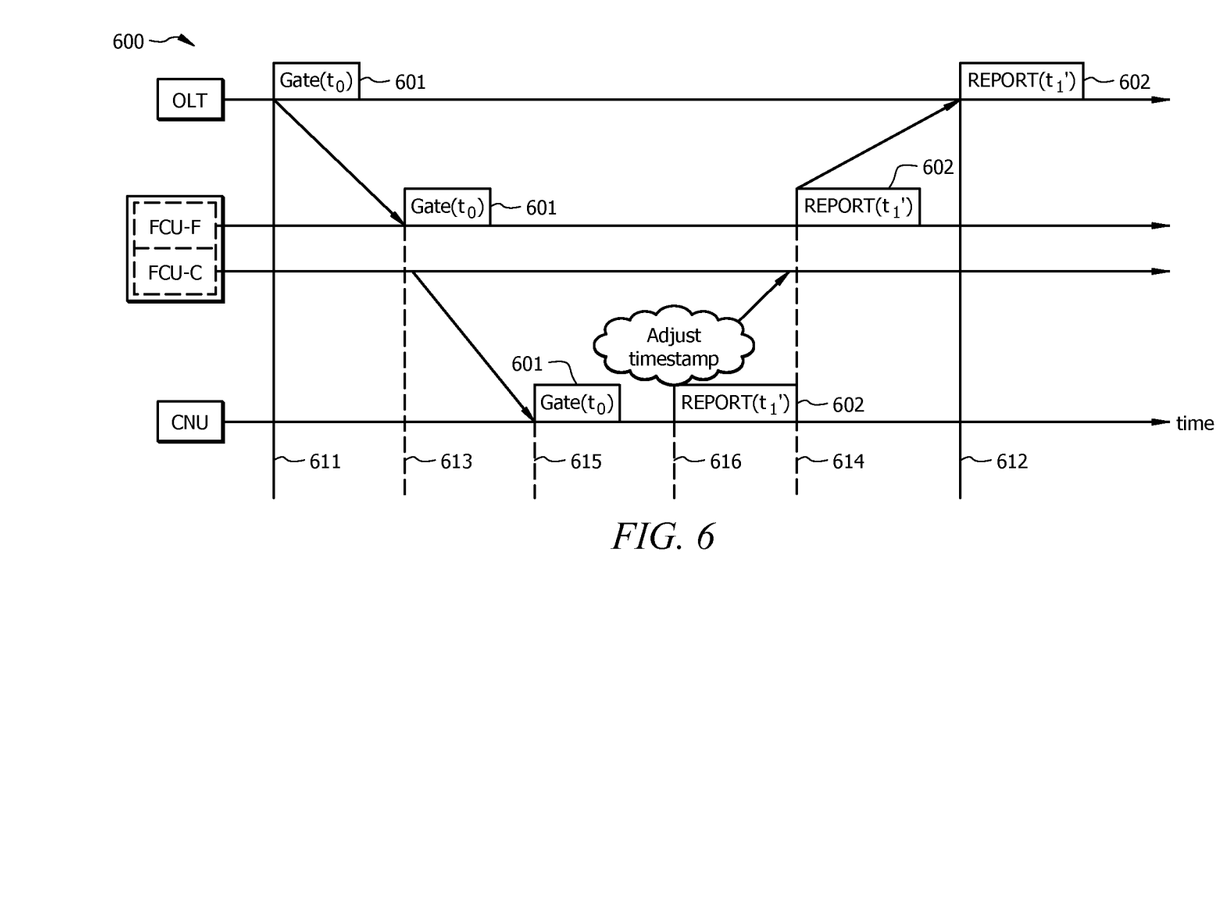
FIG. 6 is a message timing diagram of another embodiment of a method of MPCP message timestamp adjustment at a CNU.

FIG. 6 is a message timing diagram of another embodiment of a method 600 of a MPCP Report message 602 timestamp adjustment at a CNU, such as CNU 130, during bandwidth allocation in a unified optical-coaxial network, such as network 100. According to method 600, an OLT may assign a CNU with an upstream grant by sending a MPCP Gate message 601 to a FCU at OLT local optics time 611. When the MPCP Gate message 601 arrives at the FCU, the FCU may reset FCU local optics clock time 613 to the receive timestamp value $t_0$ and forward the MPCP Gate message 601 to the CNU. When the MPCP Gate message 601 arrives at the CNU, the CNU may reset CNU local coax clock time 615 to the receive timestamp value $t_0$.

After the CNU processes the grant, the CNU may send a MPCP Report message 602 to the FCU at CNU local coax time 616, denoted as $t_1$. When the MPCP Report message is transmitted at the CNU MAC layer, instead of time stamping the MPCP Report message with the local transmission time (e.g. CNU local coax time 616) according to the EPON MPCP protocol, the CNU may load an adjusted value $t_1'$ to the timestamp by subtracting the coax delay as below:

$$t_1' = \text{CNU local coax time 616} - \text{coax delay} \quad (3)$$

When the FCU receives the MPCP Report message at FCU local optics time 614, the FCU may forward the MPCP Report message 602 with the same timestamp $t_1'$ to an OLT. When the OLT receives the MPCP Report message 602, the OLT may determine the RTT between the OLT and the CNU according to the EPON MPCP protocol since the coax delay has been included when the CNU adjusts the timestamp at local coax time 616. The RTT may be the difference between the MPCP Report message 602 arrival time $t_2$ and the timestamp value $t_1'$ carried in MPCP Report message 602, which may be expressed as:

$$RTT = t_2 - t_1' \quad (4)$$

where $t_2$ is the OLT local optics time 612.

Figure 7:
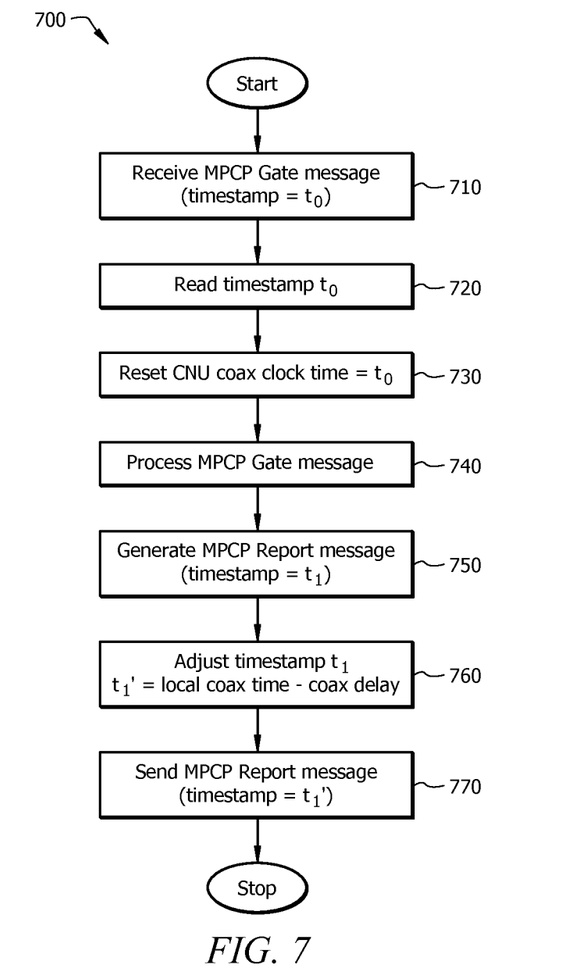
FIG. 7 is a flowchart of another embodiment of a MPCP message timestamp adjustment method at a CNU.

FIG. 7 is a flowchart of another timestamp adjustment method 700, which may be implemented on a CNU, such as CNU 130, during bandwidth allocation to account for the coax delay as described in method 600. The method 700 may begin with receiving a MPCP Gate message with a timestamp value $t_0$ forwarded by a FCU at step 710. At step 720, the CNU may read the value in the MPCP Gate message timestamp, which is the OLT local optics time when the MPCP Gate message is transmitted at the OLT MAC layer. At step 730, the CNU may reset the CNU coax clock time to the MPCP Gate message timestamp value $t_0$. At step 740, the CNU may process the grant. At step 750, the CNU may generate a MPCP Report message. At step 760, the CNU may load the MPCP Report message timestamp with an adjusted value $t_1'$, where $t_1'$ is computed by subtracting the coax delay from the CNU local coax time when the MPCP Report message is transmitted at the CNU MAC layer as shown in equation (3) described above in reference to method 600. At step 770, the CNU may send the MPCP Report message to the FCU.

Figure 8:
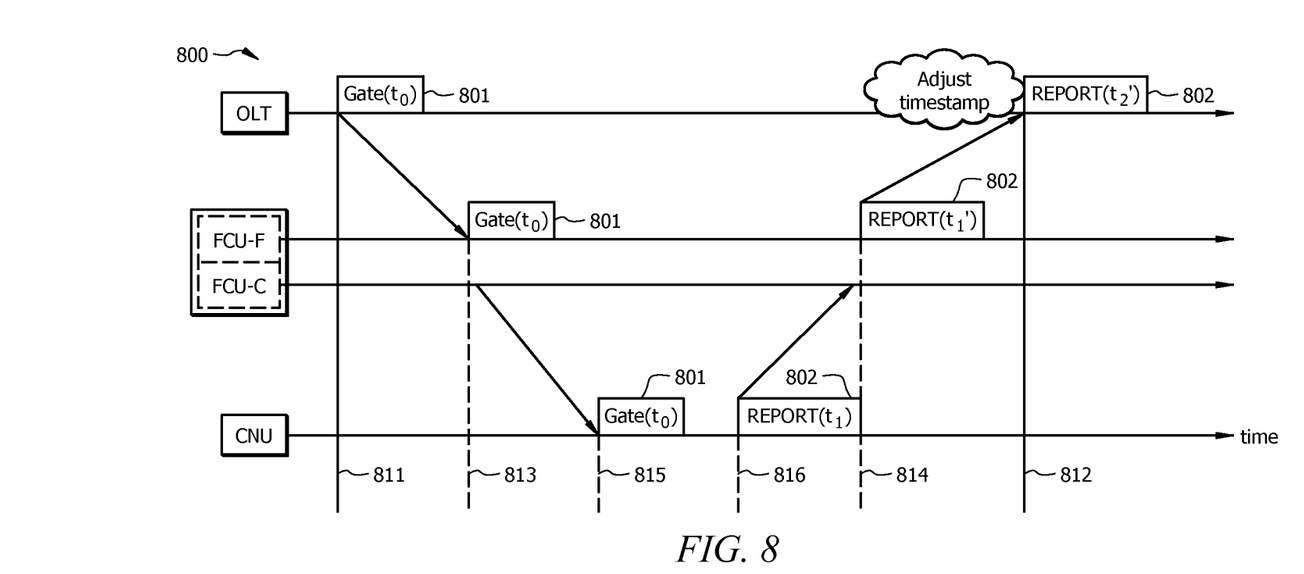
FIG. 8 is a message timing diagram of another embodiment of a method of MPCP message timestamp adjustment at an OLT.

FIG. 8 is a message timing diagram of another embodiment of a method 800 of a MPCP Report message 802 timestamp adjustment at an OLT, such as OLT 110, during bandwidth allocation in a unified optical-coaxial network, such as network 100. According to method 800, an OLT may assign a CNU with an upstream grant by sending a MPCP Gate message 801 to a FCU at OLT local optics time 811. When the MPCP Gate message 801 arrives at the FCU, the FCU may reset FCU local optics clock time 813 to the receive timestamp value $t_0$ and forward the MPCP Gate message 801 to the CNU. When the MPCP Gate message 801 arrives at the CNU, the CNU may reset CNU local coax clock time 815 to the receive timestamp value $t_0$.

After the CNU processes the grant, the CNU may send a MPCP Report message 802 to the FCU at CNU local coax time 816. The MPCP Report message 802 may be time stamped at the CNU MAC layer with the CNU local coax time 816, denoted as $t_1$. Upon receiving MPCP Report message 802, the FCU may forward the MPCP Report message 802 to the OLT at FCU local optics time 814. The MPCP Report message 802 may be time stamped at the FCU MAC layer with the FCU local optics time 814, denoted as $t_1'$.

Upon receiving MPCP Report message 802, the OLT may determine the RTT between the OLT and the CNU by computing the difference between the MPCP Report message 802 arrival time $t_2$ and the timestamp value $t_1'$ in the MPCP Report message 802. However, since the coax delay has not been included by either the CNU or the FCU, the OLT may adjust the timestamp value from $t_1'$ to $t_2'$ prior to the RTT computation. The timestamp value may be computed by subtracting the coax delay from $t_1'$ as below:

$$t_2' = t_1' - \text{coax delay} \tag{5}$$

where $t_2'$ is the adjusted timestamp value. Thus, the RTT may be computed as:

$$RTT = t_2 - t_2' \tag{6}$$
$$= t_2 - t_1' + \text{coax delay}$$

where $t_2$ is the OLT local optics time 812 and the optical delay is captured in the expression, $t_2-t_1'$ in equation (6).

Figure 9:
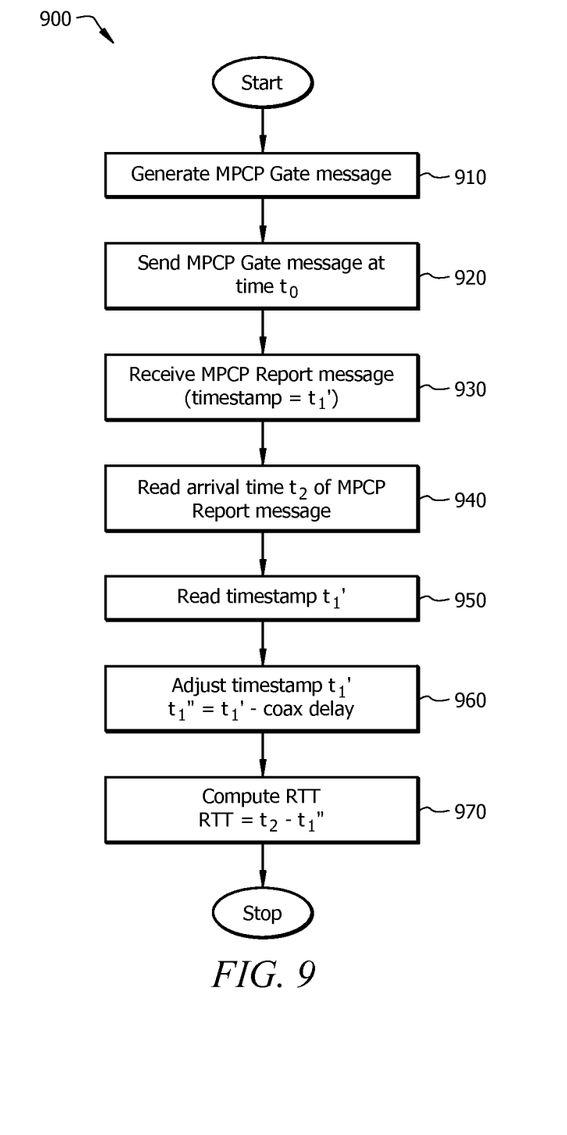
FIG. 9 is a flowchart of another embodiment of a MPCP message timestamp adjustment method and a RTT calculation method at an OLT.

FIG. 9 is a flowchart of a timestamp adjustment and RTT computation method 900, which may be implemented on an OLT, such as OLT 110, during bandwidth allocation to account for the coax delay as described in method 800. The method 900 may begin with an OLT generating a MPCP Gate message to grant a CNU an upstream transmission window at step 910. At step 920, the OLT may send the MPCP Gate message to a FCU, which may be forwarded to a CNU. The OLT MAC layer may load the MPCP Gate message timestamp with the local transmission time, which may be the OLT local clock time, denoted as $t_0$. After some time, the OLT may receive a MPCP Report message returned from a CNU and via a FCU at step 930. When the MPCP Report message is received, the OLT may read the OLT optics clock for the arrival time of the MPCP Report message, which may be denoted as $t_2$ at step 940. At step 950, the OLT may read the timestamp value $t_1'$ carried in the MPCP Report message, which may be the FCU local optics time when the MPCP Report message is transmitted at the FCU MAC layer. At step 960, the OLT may adjust the timestamp value $t_1'$ to account for the coax delay by offsetting the coax delay as shown in equation (5) described above in reference to method 800. At step 970, the OLT may determine the RTT between the OLT and the CNU by computing the offset between the arrival time $t_2$ and the adjusted timestamp value $t_1''$ according to equation (6) described above in reference to method 800.

Alternatively, the timestamp adjustment in step 960 of method 900 may adjust the arrival time of the MPCP Report message to account for the coax delay instead of the MPCP Report message timestamp. In this case, the arrival time adjustment may be computed as:

$$t_2' = t_2 + \text{coax delay} \tag{7}$$

where $t_2'$ is the adjusted arrival time. Thus, the RTT may be determined as:

$$RTT = t_2' - t_2' \tag{8}$$
$$= t_2 - t_1' + \text{coax delay}$$

Note that both equations (6) and (8) may produce the same RTT measurement, which may include delays in both the optical portion and coaxial portion of the network.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a fiber coaxial unit (FCU) comprising:
    receiving a Multi-Point Control Protocol (MPCP) report message from a coaxial network unit (CNU) via an electrical network, wherein the MPCP report message comprises a first timestamp;
    adjusting the first timestamp to create an adjusted timestamp by subtracting a coax delay; and
    forwarding the MPCP report message with the adjusted timestamp to an optical line terminal (OLT) via an optical network.

2. The method of claim 1, wherein the electrical network comprises a coaxial network, wherein the coax delay is a delay associated with a coaxial physical (PHY) interface, and wherein the optical network comprises a passive optical network (PON).

3. The method of claim 1, wherein adjusting the first timestamp comprises:
    setting the first timestamp in the MPCP report message to a local counter value when the MPCP report message passes through a local transmitting controller; and
    subtracting the coax delay from the first timestamp.

4. The method of claim 3, further comprising:
    computing the coax delay; and
    sending an Operation, Administration, and Maintenance (OAM) message comprising the coax delay to the OLT.

5. The method of claim 1, wherein the MPCP report message is an Ethernet passive optical network (EPON) MPCP Report message.

6. The method of claim 1, wherein the MPCP report message is an Ethernet passive optical network (EPON) MPCP registration request message.

7. The method of claim 1, wherein the coax delay comprises:
    an FCU downstream residence delay;
    a coaxial downstream propagation delay;
    a CNU processing delay;
    a coaxial upstream propagation delay; and
    an FCU upstream residence delay.

8. A method performed by a fiber coaxial unit (FCU) comprising:
    receiving a Multi-Point Control Protocol (MPCP) report message from a coaxial network unit (CNU) via an electrical network, wherein the MPCP report message comprises a first timestamp;
    adjusting the first timestamp in the MPCP report message based on a coax delay; and
    forwarding the MPCP report message with the adjusted timestamp to an optical line terminal (OLT) via an optical network;
    receiving an MPCP Gate message from the OLT via the optical network, wherein the MPCP Gate message comprises a second timestamp;
    setting a local counter to a value encoded in the second timestamp; and
    forwarding the MPCP Gate message to the CNU via the electrical network.

9. A method performed by an optical line terminal (OLT) comprising:
    receiving a Multi-Point Control Protocol (MPCP) message from a coaxial network unit (CNU) via a fiber coaxial unit (FCU) and an optical network;
    obtaining an arrival time of the MPCP message;
    adjusting a timestamp from the MPCP message to create an adjusted timestamp by subtracting a coax delay from the timestamp; and
    computing a round trip time (RTT) delay based on the adjusted timestamp and the arrival time.

10. The method of claim 9, wherein obtaining the arrival time comprises reading a local counter value when the MPCP message arrives at the OLT, and wherein computing the RTT delay comprises subtracting a time value in the adjusted timestamp from the arrival time.

11. The method of claim 9, further comprising receiving an Operation, Administration, and Maintenance (OAM) message comprising the coax delay.

12. The method of claim 11, wherein the OAM message is received from the FCU.

13. The method of claim 11, wherein the OAM message is received from the CNU via the FCU.

14. The method of claim 9, further comprising determining the coax delay based on a configuration of an electrical network.

15. The method of claim 9, wherein the MPCP message is an Ethernet passive optical network (EPON) MPCP Report message.

16. The method of claim 9, wherein the MPCP message is an Ethernet passive optical network (EPON) MPCP registration request message.

17. The method of claim 9, wherein the coax delay comprises:
    an FCU downstream residence delay;
    a coaxial downstream propagation delay;
    a CNU processing delay;
    a coaxial upstream propagation delay; and
    an FCU upstream residence delay.

18. A coaxial network unit (CNU) comprising:
    a receiver configured to receive a Multi-Point Control Protocol (MPCP) message comprising a first timestamp from a fiber coaxial unit (FCU) via an electrical network;
    a processor coupled to the receiver and configured to:
        set a local time based on the first timestamp; and
        encode a second timestamp in an MPCP reply message, wherein the second timestamp comprises a local transmission time adjusted for a coax delay; and
    a transmitter coupled to the processor and configured to transmit the MPCP reply message to an optical line terminal (OLT) via the electrical network, the FCU, and an optical network.

19. The CNU of claim 18, wherein adjusting the second timestamp comprises subtracting the coax delay from the second timestamp.

20. The CNU of claim 18, wherein the processor is further configured to compute the coax delay and send an Operation, Administration, and Maintenance (OAM) message comprising the coax delay to the OLT via the FCU and the electrical network.

21. The CNU of claim 18, wherein the MPCP reply message is an Ethernet passive optical network (EPON) MPCP Report message.

22. The CNU of claim 18, wherein the MPCP reply message is an Ethernet passive optical network (EPON) MPCP registration request message.

23. A fiber coaxial unit (FCU) comprising:
- a receiver configured to receive from an optical line terminal (OLT) a Multi-Point Control Protocol (MPCP) gate message comprising a first timestamp with a first local value of a first MPCP clock associated with the OLT; and
- a processor comprising a second MPCP clock and coupled to the receiver,
- wherein the second MPCP clock comprises a second local value,
- wherein the processor is configured to set the second local value to the first local value in order to achieve a synchronization function,
- wherein the receiver is further configured to receive an MPCP report message comprising a second timestamp based on the first timestamp, and
- wherein the processor is further configured to adjust the second timestamp to create an adjusted timestamp by subtracting a coax delay.

24. The FCU of claim 23, further comprising a transmitter coupled to the processor and configured to forward to the OLT the MPCP report message with the adjusted timestamp.

* * * * *